United States Patent
Wieland et al.

[15] 3,653,693
[45] Apr. 4, 1972

[54] TUBULAR CONNECTOR HAVING SPRING BIASED COUPLING MEANS

[72] Inventors: Howard N. Wieland, Amherst; Don E. Ehrlich, Huron, both of Ohio

[73] Assignee: TRW Inc., Cleveland, Ohio

[22] Filed: Dec. 20, 1968

[21] Appl. No.: 851,766

Related U.S. Application Data

[62] Division of Ser. No. 486,296, Sept. 10, 1965, Pat. No. 3,418,441.

[52] U.S. Cl.............................285/317, 285/330, 287/52.08
[51] Int. Cl..............................................................F16l 37/14
[58] Field of Search................285/305, 317, 404, 423, 308, 285/309, 310, 313, 39, 38, 7, 330; 287/52.08; 219/98, 79

[56] References Cited

UNITED STATES PATENTS

| | | | |
|---|---|---|---|
| 1,408,993 | 3/1922 | Eberhardt | 287/52.08 X |
| 2,320,397 | 6/1943 | Ross | 285/317 X |
| 2,772,898 | 12/1956 | Seeler | 285/305 X |
| 2,885,232 | 5/1959 | Eberly | 287/52.08 X |
| 3,252,721 | 5/1966 | Weasler | 285/404 |
| 3,309,495 | 3/1967 | Shoup et al. | 285/423 |
| 1,500,645 | 7/1924 | Schweinert et al. | 285/310 X |
| 2,662,712 | 12/1953 | Rose | 285/317 X |
| 2,722,399 | 11/1955 | Oetiker | 285/308 X |
| 484,656 | 10/1892 | Doolittle | 285/308 |

FOREIGN PATENTS OR APPLICATIONS

| | | | |
|---|---|---|---|
| 69,830 | 5/1915 | Austria | 285/305 |

*Primary Examiner*—Thomas F. Callaghan
*Attorney*—Philip E. Parker, James R. O'Connor, John Todd, Wall & Houghton and Gordon Needleman

[57] ABSTRACT

A quick release coupling for use with a welding apparatus including a body member for receiving a male fitting. The fitting has a longitudinally extending spline which fits into a longitudinally extending groove formed in a passage of the body member. A spring biased locking pin is carried by the body member and is positioned transversely of the passage to engage a shoulder on the fitting to couple the fitting to the body member.

3 Claims, 8 Drawing Figures

INVENTORS
HOWARD N. WIELAND
DON E. EHRLICH

BY  *Gordon Needleman*
ATTORNEY

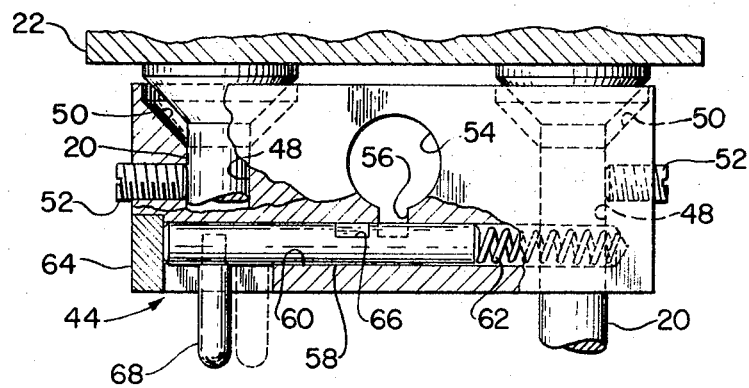
FIG. 4
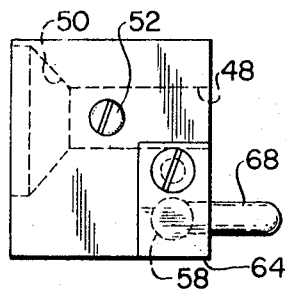
FIG. 6
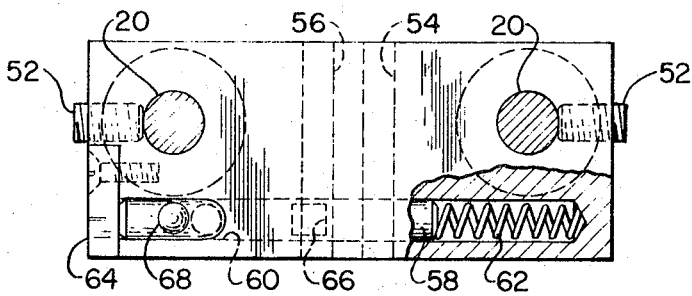
FIG. 5
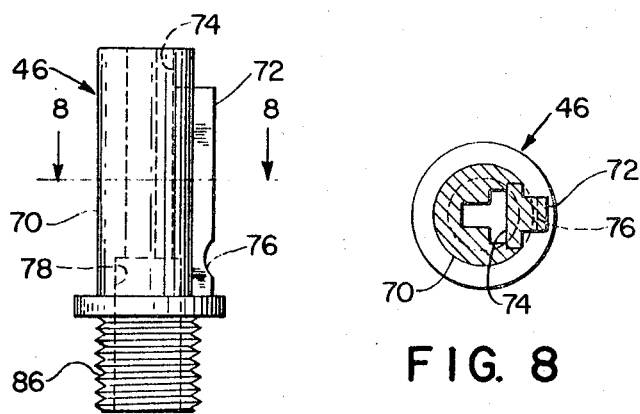
FIG. 7
FIG. 8

TUBULAR CONNECTOR HAVING SPRING BIASED COUPLING MEANS

This is a division of co-pending application Ser. No. 486,296, filed Sept. 10, 1965 and now U.S. Pat. No. 3,418,441.

This invention relates to apparatus for supplying welding studs to a stud welding tool and more particularly to a connection for a stud supply tube for quickly connecting and disconnecting the tube and the stud welding tool.

Welding tools for arc welding various types of studs in the form of fasteners, etc., to a workpiece are well known in the art. Such tools automatically control the movement of the stud and the arc established between the stud and the workpiece to enable the stud to be rapidly welded to the workpiece, usually in a fraction of a second. Such tools are being used more and more in high production applications where many studs are welded to workpieces on a production line over the period of a day. With these relatively high welding rates, it has become essential that the studs be fed quickly to the welding tool since supplying the studs, properly oriented, to the chuck of the welding tool can require a period of time much longer than that needed for the actual welding. This is especially true for small studs which may be only in the order of one-quarter inch long with a head only one-quarter inch in diameter, as are now used in large quantities for a number of fastening applications.

The size and shape of such studs renders them exceptionally susceptible to jamming when fed automatically to the stud welding tool. A particularly vulnerable portion of the loading system for the studs to jam is a loading chamber located behind the chuck of the stud welding tool. Heretofore, when studs have jammed in this chamber, they have been relatively difficult to free or dislodge primarily because a supply tube which feeds the studs into the chamber has prevented ready access to the jammed stud.

The present invention provides a connection between the supply tube and the welding tool which enables the supply tube to be quickly connected and disconnected to enable easier access to the chamber for the purpose of freeing a jammed stud. The new tube connection also enables the welding tools to be changed or replaced rapidly for purposes of repair or to enable a different style of tool to be used, for example.

The new connection properly aligns the supply passage with the loading chamber and also properly orients the supply passage with the inlet opening of the loading chamber. The supply tube can be disconnected simply by manipulating a releasing means and can be easily re-connected by the same technique.

It is, therefore, a principal object of the invention to provide a connection between a stud supply tube and a welding tool for enabling the tube to be quickly connected or disconnected.

Another object of the invention is to provide apparatus for supplying studs to a stud welding tool and for enabling the apparatus to be disconnected quickly to enable access to a jammed stud.

Other objects and advantages of the invention will be apparent from the following detailed description of a preferred embodiment thereof, reference being made to the accompanying drawing, in which:

FIG. 4 is a plan view of a connecting body or block forming part of the tube connection shown in FIGS. 2 and 3, with parts broken away and with parts in section;

FIG. 5 is a rear view in elevation, with parts broken away and with parts in section, of the connecting body of FIG. 4;

FIG. 6 is a left side view of the body of FIG. 5;

FIG. 7 is a view in elevation of a tube fitting constituting an element of the connection along with the body; and FIG. 8 is a view in transverse cross section taken along the line 8—8 of FIG. 7.

Figure 1:
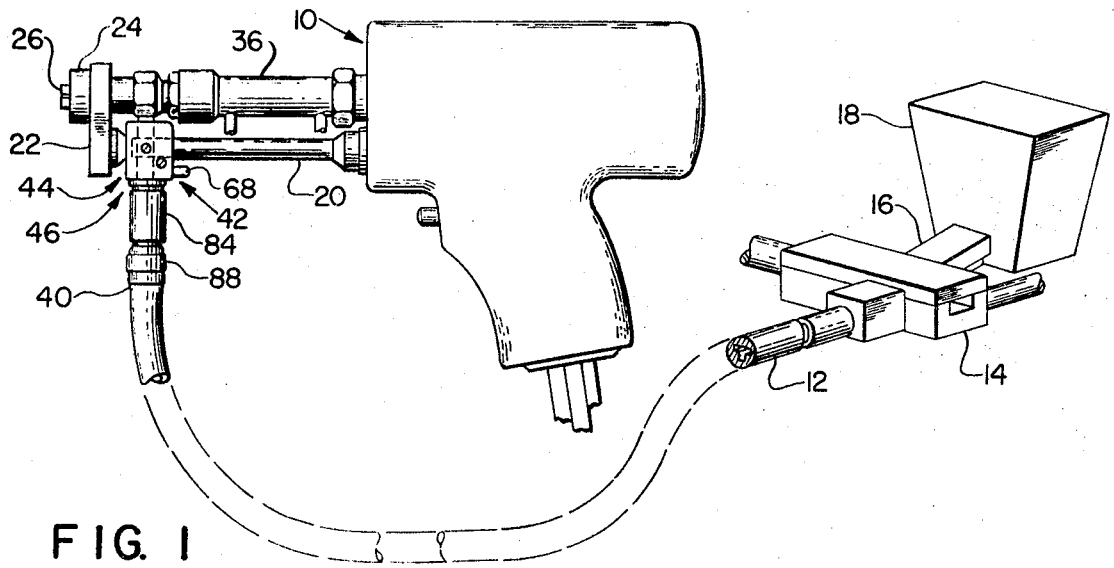
FIG. 1 is a somewhat schematic view, partly in elevation and partly in perspective, of a stud welding tool and apparatus for supplying studs sequentially thereto.

Referring particularly to FIG. 1, a welding tool 10 can be of a number of suitable types such as is shown in detail in a co-pending application of Steve Spisak entitled "Apparatus for Welding Studs," Ser. No. 426,274 and now U.S. Pat. No. 3,448,236. Studs are supplied to the tool 10 through a flexible supply tube 12 from an escapement 14 to which the studs are fed down an inclined track 16 from a hopper 18.

Figures 2, 3:
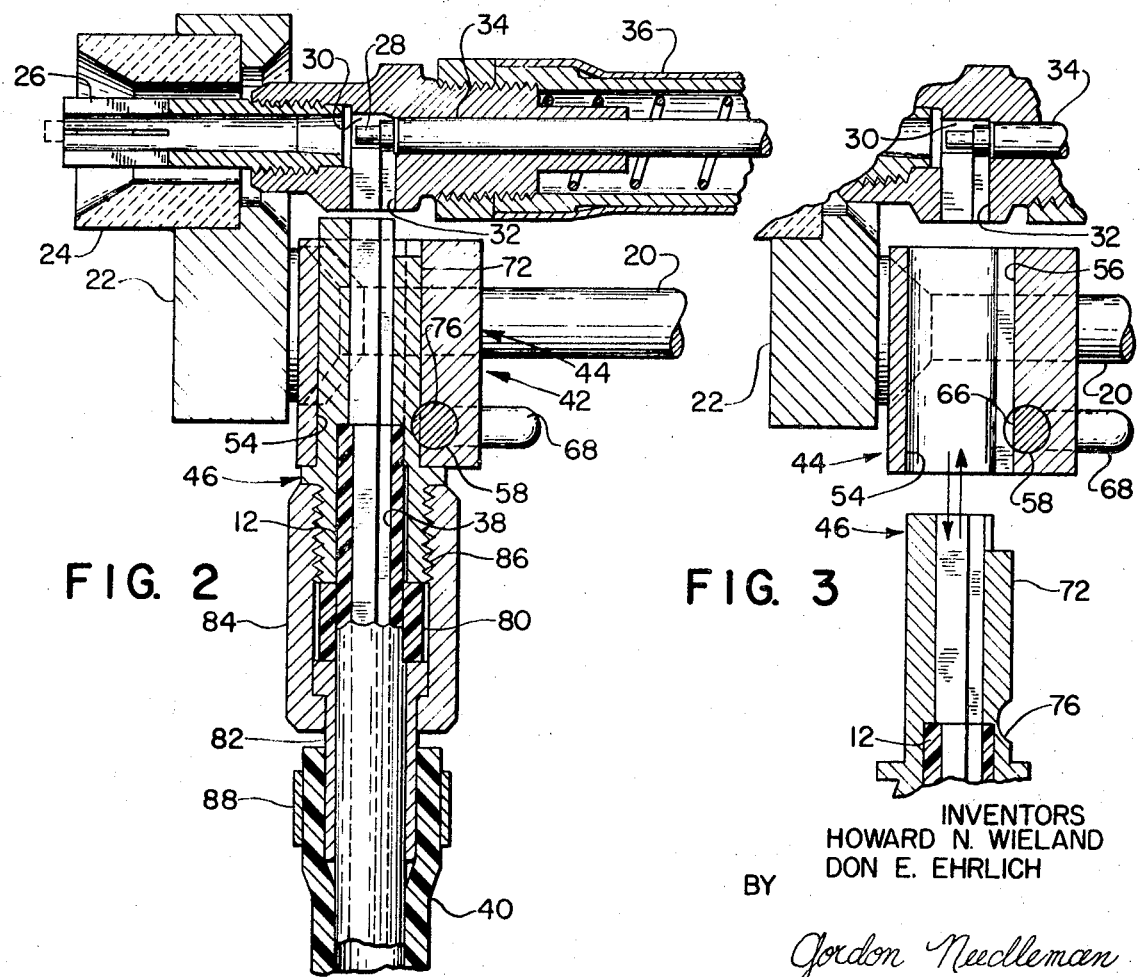
FIG. 2 is a greatly enlarged, fragmentary view in vertical cross section of part of the welding tool, supply tube, and a connection therebetween, as shown in FIG. 1.
FIG. 3 is a fragmentary view of a portion of FIG. 2 showing components of the connection in a released or dis-assembled position.

As also shown in FIG. 2, the tool 10 includes spark-shield supporting means illustrated specifically in the form of a pair of spaced supporting legs 20 and an insulating holder 22 at the front end of the tool with a spark shield 24 received in the holder 22. A chuck 26 holds small welding studs 28 in the position shown in dotted lines during the welding operation, with the studs supplied to a loading chamber 30 through an inlet 32 and moved forwardly by a piston rod 34 powered by an air-operated cylinder 36. The studs are received sequentially in the loading chamber from the flexible supply tube 12, being transported therethrough by air pressure. The tube 12 has a passage 38 therein having a transverse cross-sectional shape equal to the shape of the stud 28 in longitudinal cross section, so that the studs 28 can be supplied sideways through the passage 38. The supply tube 12 also has an outer sheath 40 which serves primarily to protect the tube 12.

The studs 28 occasionally become cocked and jam in the chamber 30 or the inlet 32 primarily because of the fact that the length of the studs is short relative to the head diameter. When the studs become jammed, they are often difficult to free because of limited access to the chamber 30, either through the chuck 26 or the inlet 32. This problem is largely overcome, however, by a quick-release connection 42 embodying the invention provided between the tool 10 and the supply tube 12. The connection 42, as shown, consists basically of two elements, a connecting body or block 44 and a readily detachable tube fitting 46. The body 44 is supported by the tool and specifically by the spark-shield supporting means or legs 20 near the loading chamber 30. For this purpose, as shown specifically in FIGS. 4 and 5, the body 44 includes two spaced leg passages 48, with enlarged front portions 50, to receive the legs 20 of the tool 10. The body 44 can be attached to the legs by setscrews 52 or other suitable means, when the body 44 is properly aligned with the inlet 32 of the loading chamber 30.

The body 44 also has a fitting passage 54 extending completely therethrough to receive the fitting 46. The passage 54 is generally perpendicular to the leg passages 48 and is located therebetween. In this instance, the passage 54 also includes a groove 56 extending longitudinally thereof to help orient and hold the fitting 46. Other suitable means can be used, however, to orient the fitting 46 relative to the body.

The body 44 also has releasable means for holding the fitting 46. As shown, the releasable means is in the form of a locking pin 58 located in a chamber 60 transversely of the passage 54. The pin has a portion extending into the groove 56 when in a first or locking position against an end wall 64, as viewed in FIG. 4, being urged to this position by a spring 62. The locking pin 58 also has a notch 66 which enables the pin to clear the groove 56 when the pin is moved to a second or release position against the force of the spring 62, by means of a handle 68.

Referring more particularly to FIGS. 7 and 8, the fitting 46 has means to orient the fitting relative to the body and has means engageable with the releasable means of the body. As shown, the fitting 46 includes a generally cylindrical portion 70 which fits closely in the passage 54 of the body and includes a spline 72 which extends into the groove 56 to properly orient a T-shaped passage 74 of the fitting relative to the body. The passage 74 is similar in size and shape to the supply passage 38 and constitutes an extension thereof, from the end of the tube to a point spaced slightly from the inlet 32. The spline 72 has a notch or opening 76 therein through which a portion of the locking pin 58 extends when in the first or left hand position of FIG. 4. Under these conditions, the fitting 46 is held securely in the connecting body 44 and cannot be disassembled until the locking pin 58 is moved to the second position and the notch 66 is aligned with the groove 56 so that the pin clears the groove and spline. As shown, the spline 72 is made separately from the cylinder 70 and is suitably affixed thereby as by brazing or the like.

The fitting 46 has suitable means for making an attachment with the supply tube 12. As shown, the tube 12 is received in a recess 78 of the fitting and has a ring 80 affixed thereto, behind which is a nipple 82. A nut 84 engages threads 86 of the fitting and holds the nipple and ring, along with the tube 12, securely in the fitting 46. The guard tube or sheath 40 is then received on the nipple 82 and held in place by a band 88. The specific supply tube attachment of the fitting 46, however, does not constitute part of the invention.

As will be apparent from the above discussion, the fitting 46 can be quickly attached to the body 44 and released therefrom by simple manipulation of the locking pin 58. The fitting 46 is normally held in the body 44 as shown in FIG. 2 with studs supplied through the tube passage 38, the fitting passage 74, and the opening 32. In the event one of the studs 28 should jam, the locking pin 58 is simply moved to the second position by an operator grasping the handle 68 to align the notch 66 with the groove 56, at which time the fitting 46 is removed from the body 44. The jammed stud can then be removed or properly aligned by access through the passage 54 in the body 44. The passage 54 is much larger than the stud passage 38 in the tube 12 so that easier access is provided to the inlet 32 and the chamber 30 when the fitting 46 is removed.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A quick release connection including a body having a first passage and a second passage formed therein and a locking means, the axis of the first passage and the second passage in right angle relation to each other and intersecting each other, the locking means comprising a spring and a rod member, the first passage having a groove opening into it and extending longitudinally thereof, the spring lying within the second passage and the rod member lying within the second passage, intersecting the groove and having a notch formed therein, the spring urging the notch out of alignment with the groove and the rod member adapted to be moved to align the groove and the notch, a fitting held within the first passage by the rod member said fitting having a spline extending longitudinally thereof to fit in said groove, and said spline having a shoulder to engage said rod member.

2. A quick release connection as set forth in claim 1 wherein the body has a first side and a second side, and the locking means is located closer to the first side than to the second side.

3. A quick release connection as set forth in claim 1 wherein said locking means includes a locking pin and the integral handle means extending therefrom.

* * * * *